United States Patent [19]
De Vanssay et al.

[11] Patent Number: 6,003,385
[45] Date of Patent: Dec. 21, 1999

[54] ULTRASOUND APPARATUS FOR MEASURING THE FLOW SPEED OF A FLUID

[75] Inventors: Robert De Vanssay, Savigny sur Orge; Jean Simon, Paris; Alain Bazin, Villejuif; Lionel Beneteau, Montrouge, all of France

[73] Assignee: Schlumberger Industries, S.A., Montrouge, France

[21] Appl. No.: 08/858,681

[22] Filed: May 19, 1997

[30] Foreign Application Priority Data

May 17, 1996 [FR] France ................................. 96 06258

[51] Int. Cl.$^6$ ....................................................... G01F 1/66
[52] U.S. Cl. ......................................................... 73/861.25
[58] Field of Search ........................... 73/861.25, 861.26, 73/861.27, 861.28, 861.29

[56] References Cited

U.S. PATENT DOCUMENTS

| | | | |
|---|---|---|---|
| 5,115,670 | 5/1992 | Shen | 73/861.29 |
| 5,650,572 | 7/1997 | Vontz | 73/861.28 |
| 5,796,009 | 8/1998 | Delsing | 73/861.28 |
| 5,831,175 | 11/1998 | Fletcher-Haynes | 73/861.28 |

OTHER PUBLICATIONS

Siliconix incorporated, Analog Switches and Their Applications, pp. 3–18, fig. 2.26, 1976.

*Primary Examiner*—Benjamin R. Fuller
*Assistant Examiner*—Jewel V. Thompson
*Attorney, Agent, or Firm*—Leonard W. Pojunas

[57] ABSTRACT

The invention relates to ultrasound apparatus for measuring the flow speed of a fluid, the apparatus comprising first and second ultrasound transducers disposed at points that are spaced apart in the direction of fluid flow, a transmitter module, a receiver module, and switch means organized so that each of the first and second transducers operates alternately as a transmitter and as a receiver. The transmitter module includes at least one transmission signal generator whose output is permanently connected via two logic gates each followed by a respective resistive divider bridge to a respective first terminal of the first and second transducer, and in that the first and second switch means are interposed respectively between the first terminals of said first and second transducers and the receiver module.

14 Claims, 3 Drawing Sheets

ULTRASOUND APPARATUS FOR MEASURING THE FLOW SPEED OF A FLUID

FIELD OF THE INVENTION

The present invention relates to an ultrasound apparatus for measuring the speed of flow of a fluid, the apparatus comprising first and second ultrasound transducers disposed at points spaced apart in the flow direction of the fluid, a transmitter module, a receiver module, an electrical power supply module, an electronic control circuit, and switch means organized in such a manner that each of the first and second transducers operates alternately as a transmitter and as a receiver, one of the transducers operating as a transmitter while the other transducer is operating as a receiver, and vice versa.

BACKGROUND OF THE INVENTION

It has been known for many years to measure the flow rate (or volume) of a fluid flowing along a duct by using the propagation of sound signals transmitted between two sound transducers situated at points that are spaced apart in the flow direction of the fluid. Basically, a sound signal transmitted from the first transducer to the second transducer is received by the second transducer and the propagation time $T_1$ of the sound signal is measured. Similarly, the propagation time $T_2$ of a sound signal transmitted from the second transducer to the first transducer is measured after said signal has been received by said first transducer.

In a fluid meter, the flow rate can be obtained by combining the measured propagation times concerning the two sound signals transmitted in two opposite directions between the two points with a measurement of the sound phase shifts induced in each sound signal by the propagation of each of the sound signals in the flow. European patent application No. 0 426 309 describes an example of such a flow rate measuring system, in which the received signal is sampled and converted into digital form, with sound phase shift being measured by performing synchronous detection on the digitized signal.

Various types of electronic circuit can be used to meter fluid by the method of measuring the flow speed of the fluid by means of ultrasound. FIG. 4 is a block diagram of an example of such an electronic circuit associated with two ultrasound transducers 1, 2 located at a distance from each other in a duct 3 along which there flows a fluid such as a gas. The two transducers 1, 2 are connected to a switch block 4 which has two switches 5, 6 and enables each transducer to be used alternately as a transmitter and as a receiver. A transmitter module 14 and a receiver module 17 are respectively connected to the switches 5 and 6 in the switch block 4. The transmitter module 14 comprises an operational amplifier 16 and a digital-to-analog converter 15. The receiver module 17 comprise at least one amplifier 18 and an analog-to-digital converter 19 which digitizes and samples the received signal, e.g. simultaneously. An electrical power supply 7 and a power supply control module 8 are connected to the transmitter module 4 and the receiver module 17, and also to the switch block 4 and to an electronic control circuit such as a microcontroller 10. The microcontroller 10 includes, in particular, a crystal clock 9, an arithmetic and logic unit, random access memory (RAM), and read only memory (ROM), and is capable of co-operating with display circuits 13, a re-writable read only memory 12, and a serial link 11 of the RS 232 type.

Gas meters for each subscriber in a distribution network must be simultaneously accurate, reliable, and as cheap as possible. These constraints make it necessary to optimize the implementation of the electronic circuits and to avoid using expensive components such as inductors or operational amplifiers fitted with adjustment members for example, while nevertheless guaranteeing that there are no errors which could be due, for example, to the presence of stray capacitance or to zero-point drift associated with the fact that each transducer is not associated with the same impedance when operating as a transmitter and as a receiver.

SUMMARY OF THE INVENTION

The invention seeks to remedy at least one of the above drawbacks by proposing an ultrasound apparatus for measuring the speed of flow of a fluid, the apparatus comprising first and second ultrasound transducers disposed at points spaced apart in the flow direction of the fluid, a transmitter module, a receiver module, an electrical power supply module, an electronic control circuit, and switch means organized in such a manner that each of the first and second transducers operates alternately as a transmitter and as a receiver, one of the transducers operating as a transmitter while the other transducer is operating as a receiver, and vice versa, the apparatus being characterized in that the transmitter module comprises at least one transmission signal generator whose output is permanently connected via a first logic gate followed by a first resistive divider bridge to a first terminal of the first transducer, and via a second logic gate followed by a second resistive divider bridge to a first terminal of the second transducer, and in that first and second switching means are interposed between the receiver module and the first terminals of the first and second transducers respectively.

The first resistive divider bridge includes a first resistor connected between the first terminal of the first transducer and the output of the first logic gate, and of resistance that is much greater than the output impedance of said first logic gate, and the second resistive divider bridge includes a second resistor connected between the first terminal of the second transducer and the output of the second logic gate, and of resistance that is much greater than the output impedance of said second logic gate.

The first and second resistors have resistances that are identical to within less than 0.1%.

The first and second logic gates are implemented in the same integrated circuit.

The receiver module comprises a single non-inverting amplifier of high input impedance.

The first and second switch means are implemented in different integrated circuits.

This greatly reduces the capacitive coupling between the switches.

In an advantageous embodiment, the first switch means comprises first and second switches connected in series between said first terminal of the first transducer and the non-inverting input of the non-inverting amplifier, together with a third switch connected between a point common to the first and second switches and to a reference potential, the third switch being open when the first and second switches are closed, and vice versa, and in that the second switch means comprises fourth and fifth switches connected in series between said first terminal of the second transducer and the non-inverting input of the non-inverting amplifier, together with a sixth switch connected between a point common to the fourth and fifth switches and to a reference potential, the sixth switch being open when the fourth and fifth switches are closed, and vice versa.

This embodiment makes it possible to reduce coupling via the link capacitances through each switch.

In order to reduce electricity consumption, the apparatus includes a pulsed electrical power supply module and first and second additional switches connected in parallel with the first and second transducers respectively, the first and second additional switches being controlled so as to be closed in temporary manner each time the first and second transducers are switched on from the pulsed electrical power supply module.

In another particular embodiment, the electrical power supply comprises a self-contained source of energy comprising at least one battery and at least one amplifier for defining a reference potential constituting a midpoint relative to the voltage available across the terminals of the self-contained energy source, the first and second transducers and the transmitter module all being referenced relative to said reference potential constituting a midpoint.

In this case, the first logic gate is subdivided into identical third and fourth logic gates whose inputs are permanently connected to the transmission signal generator and whose outputs are connected via respective same-resistance third and fourth resistors constituting potions of the first resistive divider bridge to a first terminal of the first transducer whose second terminal is connected to said reference potential and the second logic gate is subdivided into identical fifth and sixth logic gates whose inputs are permanently connected to the transmission signal generator and whose outputs are connected via respective same-resistance fifth and sixth resistors identical in resistance to the third and fourth resistors and constituting potions of the second resistive divider bridge to a second terminal of the second transducer whose second terminal is connected to said reference potential.

In yet another embodiment, means are provided to create a high impedance seen at the terminals of each transducer while it is transmitting in order to further reduce the coupling between the transducers via the electronic circuit.

For example, a transistor is connected in a common collector configuration across the terminals of each transducer, and a saturation voltage $V_{EC}$ is maintained between the emitter and the collector of said transistor by respective constant current generator saturating it.

Advantageously, means for storing the voltage at the terminals of each transistor are located respectively in series with the first and second additional switches in parallel respectively with the first and second transducers so as to avoid a voltage drop when the apparatus is switched on.

BRIEF DESCRIPTION OF THE DRAWINGS

Other characteristics and advantages of the invention appear from the following description of particular embodiments of the invention, given as examples, and described with reference to the accompanying drawings, in which.

DETAILED DESCRIPTION OF THE PREFERRED EMBODIMENTS

The present invention relates to apparatus for measuring the flow speed of a fluid such as a gas, enabling consumption of the fluid to be metered, and implementing two ultrasound transducers 1, 2 which are disposed at a distance one from the other inside a duct in the fluid flow direction.

Figure 1:
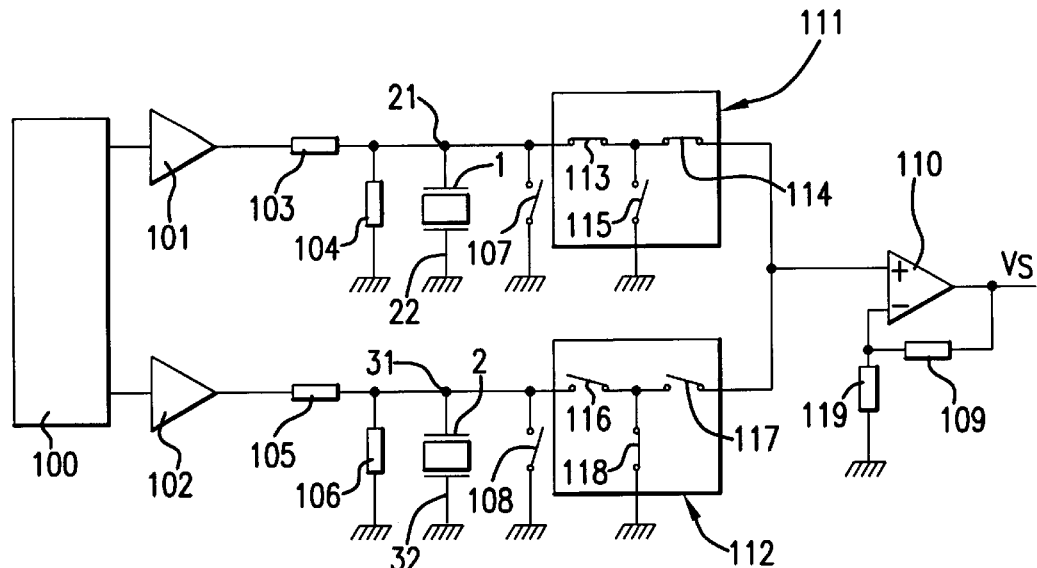
FIG. 1 is a circuit diagram of a portion of the electronic circuits of apparatus for measuring the flow speed of a gas in a first embodiment of the invention.
Figure 2:
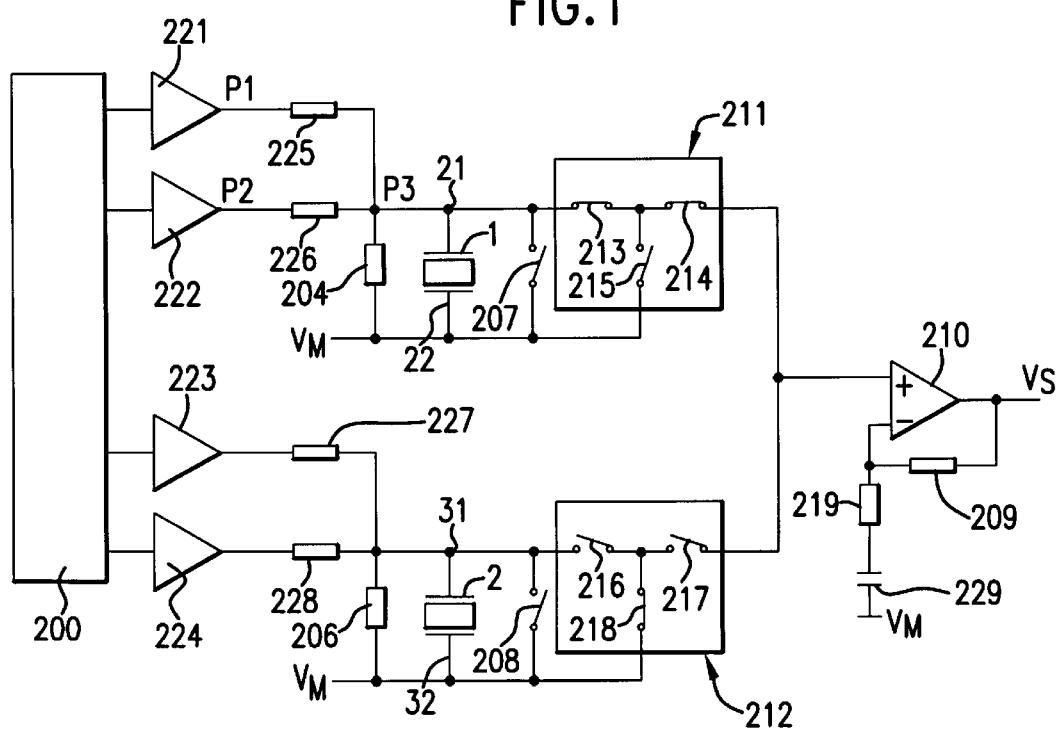
FIG. 2 is a circuit diagram of a portion of the electronic circuits of apparatus for measuring the flow speed of a gas in a second embodiment of the invention.

Advantageously, each transducer 1, 2 operates at a frequency of the order of 40 kHz, and comprises a first terminal connected to a reference potential which, in the embodiment of FIG. 1 is ground, and in the embodiment of FIG. 2 is a potential $V_M$ which constitutes a midpoint relative to the two poles of an electrical power supply constituted by one or more batteries. A first terminal 21, 31 of each transducer 1, 2, is, in accordance with the invention, permanently connected to a respective signal transmitter circuit and is intermittently connected via switches to a single receiver circuit, with each transducer 1, 2 acting alternately as a transmitter and as a receiver.

Figure 4:
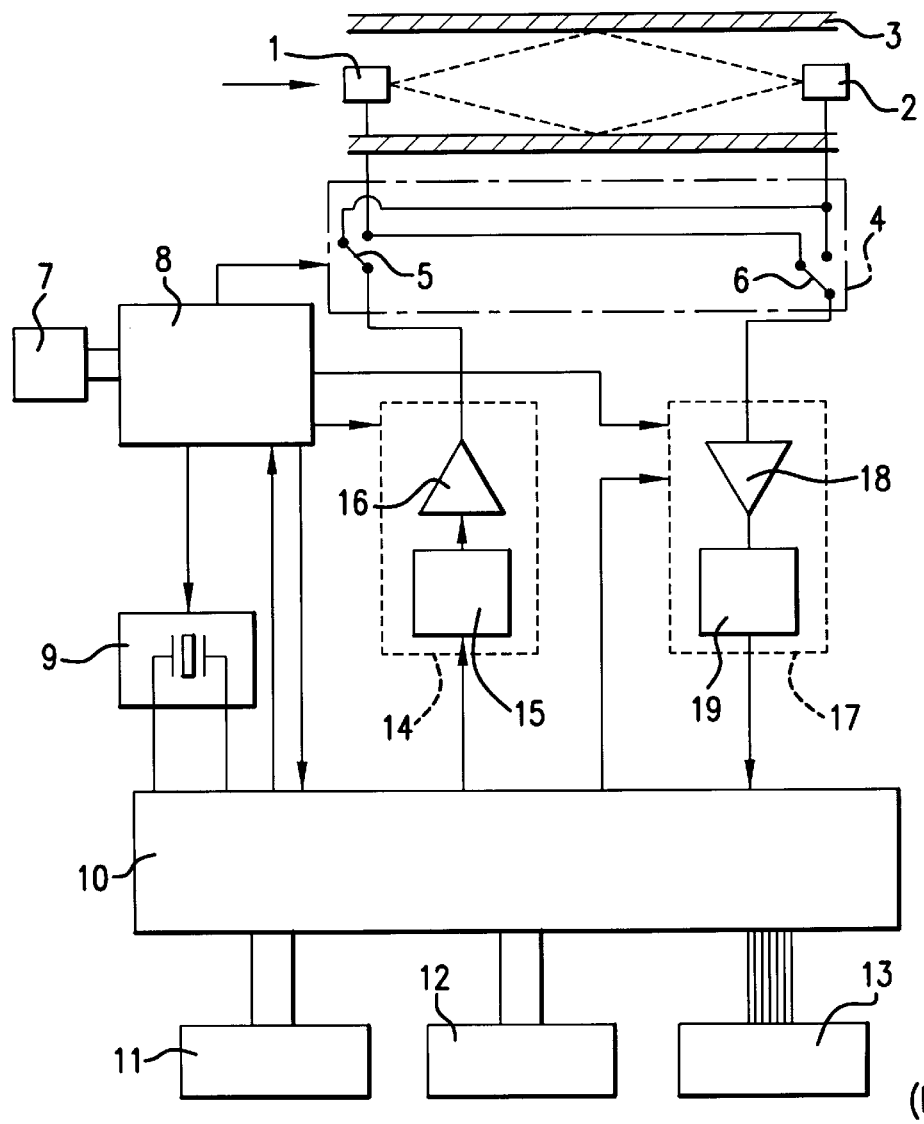
FIG. 4 is a block diagram of an entire prior art gas metering apparatus to which the present invention is applicable.

In a first embodiment, FIG. 1 shows essentially the electronic circuits for transmission, switching, and amplification as associated with the transducers 1 and 2. These circuits replace the modules 4, 16, and 18 of the diagram of FIG. 4. FIG. 1 (and similarly FIG. 2 relating to a second embodiment) does not show again the circuits that have already been implemented in conventional manner in ultrasound transducer gas metering apparatuses and that are illustrated in FIG. 4, i.e. the electrical power supply circuits 7, 8, the digital-to-analog and analog-to-digital converter circuits 15, 19, the memories or meters associated with the circuits 15, 19, the crystal clock 9 that delivers a reference frequency, the electronic control circuit 10, such as a microcontroller, for example, or its communication interfaces or peripherals 11, 12, and 13.

In FIG. 1, there can be seen a transmission signal generator 100 whose output is permanently connected to the inputs of two logic gates 101 and 102, e.g. both implemented in the same integrated circuit. By implementing the gates 101 and 102 in the same integrated circuit, it is possible to ensure that the transit times and the output impedances of these gates are as similar as possible. Nevertheless, it is not possible to know the output impedances of the gates 101 and 102 to great accuracy in advance, and residual differences may still exist between the output impedances of the gates 101 and 102. To reduce this risk, resistors 103 and 105 are connected in series between the outputs of the gates 101 and 102 and the first inputs 21 and 31 of the transducers 1 and 2, with the second terminals 22 and 32 of the transducers being connected to ground. The resistors 103 and 105 present resistances that are identical to within less than 0.1%, which can be achieved easily and cheaply for simple components of this type. To reduce the influence of possible differences between the output impedances of the gates 101 and 102, the resistors 103 and 105 have resistances that are much greater than said output impedances.

By way of example, the resistors 103 and 105 may have resistances of the order of 10 kΩ whereas the output impedances of the logic gates 101 and 102 may be of the order of 60 Ω. As a result, the impedances seen from the transducers 1 and 2 can be very close even if the output impedances of the logic gates 101 and 102 may present significant variations in percentage terms.

The resistors 103 and 105 form parts of resistive divider bridges each including a second resistor 104, 106 connected in parallel with the corresponding transducer 1, 2. The resistances of each resistive divider bridge 103, 104; 105, 106 are designed to deliver a transmission signal of required amplitude to each of the transducers 1, 2.

Such a configuration (resistive divider bridge between each logic gate connected to the transmission signal generator and a terminal of a transducer) presents the advantage of being simple and inexpensive, given the components used. Also, the apparatus configured in this way is reliable and accurate while requiring little power for operation.

The receiver module comprises a single non-inverting amplifier 110 that has high input impedance, thereby making it possible to use low impedance switches 111, 112 between the first terminals 21, 31 of the transducers 1, 2 and the non-inverting input of the amplifier 110, even when the low impedances of the switches might present small differences, and without that influencing the quality of the circuit. Resistors 109 and 119 are associated with the operational amplifier 110 in conventional manner.

Given that the switches 111 and 112 present impedance that is very low compared with the input impedance of the amplifier 110, there is no need for the switches to be matched pairs, thus considerably reducing the cost of the resulting apparatus.

The switches 111 and 112 are implemented in different integrated circuits, thus making them insensitive to the usual capacitive coupling that exists between switches integrated in a common circuit in a common package. In a particular embodiment of the invention, in order to further limit the risk of coupling between the transmission signal and the reception signal, the switches 111 and 112 have a T-structure that limits coupling via the link capacitance within each switch block 111, 112.

Thus, as can be seen in FIG. 1, switch block 111 comprises switches 113 and 114 connected in series between the terminal 21 of the transducer 1 and the non-inverting input of the amplifier 110, together with a third switch 115 connected between the point common to the switches 113 and 114 and ground, which in this embodiment constitutes the reference potential for the terminal 22 of the transducer 1. Similarly, switch block 112 comprises switches 116 and 117 connected in series between the terminal 31 of the transducer 2 and the non-inverting input of the amplifier 110, together with a third switch 118 connected between the point common to the switches 116 and 117 and ground, i.e. the reference potential for the terminal 32 of the transducer 2.

When the switch block 111 is open, the switches 113 and 114 are also open while the switch 115 is closed so as to maintain a fixed potential (ground) on one terminal of the switch 114, thereby considerably reducing coupling.

When the switch block 111 is closed, the switches 113 and 114 are closed while the switch 115 is open.

The same applies to corresponding respective switches 116, 117, and 118 of the other block 112.

In FIG. 1, switch block 111 is shown in the closed position while switch block 112 is shown in the open position.

The various characteristics described above make it possible for the two transducers 1, 2 to define transmitter circuit and receiver circuit impedances that are equal and electronic coupling between the transmission signal and the received signal is non-existent or kept to a minimum.

To further limit the power consumption of the electronic circuits, they advantageously operate with a pulsed power supply. Under such circumstances, it is necessary to avoid exciting the transducers 1, 2 during switch-on when transient signals appear. For this purpose, additional switches 107 and 108 are connected in parallel with the transducers 1 and 2 respectively. During switch-on, one of the switch blocks 111 and 112, e.g. the switch block 112 is in the open position, while the other switch block 111 or 112 (i.e. switch block 111 in this example) is in the closed position. During switch-on, the additional switches 107 and 108 are both in the closed position. As a result, the lowest possible resistance is maintained across the terminals of the transducers 1 and 2 during switch-on so that the transient signals do not excite the transducers 1, 2.

Figure 3:
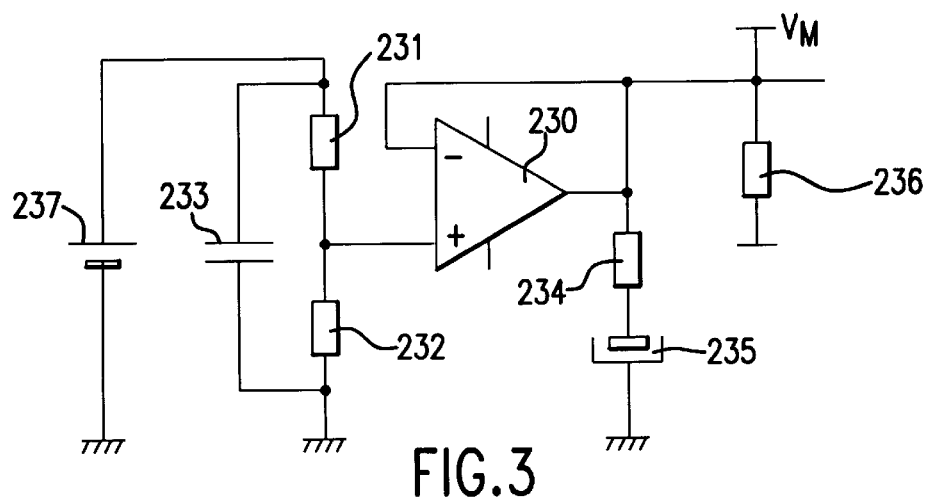
FIG. 3 is the diagram of an example of an electronic circuit for creating a voltage reference midpoint suitable for use in combination with the electronic circuits of FIG. 2.

FIGS. 2 and 3 show a second embodiment of the invention in which the circuits are powered by batteries 237 delivering a defined voltage, e.g. 2.5 V or 3 V, and a circuit such as the circuit shown in FIG. 3 creates a potential midpoint $V_M$ which constitutes the reference potential for the transducers 1, 2.

FIG. 3 shows an operational amplifier 230 whose non-inverting input is connected to the common point of resistors 231 and 232 of a resistive divider bridge powered by the batteries 237. A capacitor 233 is connected in parallel with the batteries 237. The output from the amplifier connected to ground via a low resistance resistor 234 and a capacitor 235. The inverting input of the amplifier 230 is connected to the output of the amplifier 230 which delivers the reference voltage $V_M$. A resistor 236 is connected between ground and the terminal at the reference potential $V_M$.

Once the transducers 1, 2 are referenced to a reference potential $V_M$, the signal transmission circuits must also be referenced to said point. FIG. 2 shows the transmitter and receiver circuits associated with the transducers 1, 2 and adapted to the case where the reference potential $V_M$ is other than ground potential.

The receiver amplifier 210 and its resistors 209, 219 can be entirely analogous to the receiver amplifier 110 and its resistors 109 and 119. Nevertheless, the resistor 219 may be connected via a capacitor 229 to the reference potential $V_M$. The switch blocks 211 and 212 with their switches 213 to 215 or 216 to 218 respectively are identical to the switch blocks 111 and 112 with their switches 113 to 115 and 116 to 118. Nevertheless, the switches 215 and 218 are connected to the reference potential $V_M$ and not to ground like the switches 115 and 118. Similarly, the additional switches 207 and 208 are similar to the additional switches 107 and 108, but they are connected to the reference potential $V_M$ rather than to ground. The resistors 204 and 206 of the divider bridges associated with the transducers 1 and 2 are likewise similar to the resistors 104 and 106, but they are connected respectively to the terminals 22 and 32 of the transducers 1 and 2 which are at the reference potential $V_M$.

To take account of the existence of a reference potential as constituted by a midpoint $V_M$, the transmission signal generator 200 is connected to the inputs of two pairs of logic gates 221 & 222 and 223 & 224. These logic gates 221, 222, 223, and 224 are preferably implemented in the same integrated circuit. The output of logic gate 221 is connected by a resistor 225 to the end of the resistor 204 which is not connected to the reference potential $V_M$, and to the terminal 21 of the transducer 1. The output of logic gate 223 is similarly connected via a resistor 227 to the end of the resistor 206 that is not connected to the reference potential $V_M$, and to the terminal 31 of transducer 2.

In each pair, the other gate 222 or 224 is likewise connected via a respective other resistor 226 or 228 to the terminal 21 or 31 of the corresponding transducer.

As in the embodiment of FIG. 1, the resistors 225, 226, 227, and 228 are of resistances that are equal to within 0.1% and much greater than the output impedances of the logic gates 221 to 224 so as to guarantee no offset of the zero point while measuring speed.

Once the reference potential $V_M$ is equal to half the power supply voltage $V_{PS}$ from the batteries 237, and the resistors 225 to 228 are all of equal resistance, the potential $P_3$ applied to the terminal 21 of the transducer 1, and similarly to the terminal 31 of the transducer 2, is equal to the mean of the potentials $P_1$ and $P_2$ output by the gates 221 & 222 or 223 & 224, as appropriate.

If $P_1=0$ and $P_2=V_{PS}$, then $P_3=V_M$. In which case there can be no transmission from the corresponding transducer.

Transmission takes place when, for components associated with a given transducer, $P_1=V_{PS}$ and $P_2=V_{PS}$, so $P_3=V_{PS}$, and then $P_1=0$ and $P_2=0$ so $P_3=0$.

The various measures recommended in the context of the present invention guarantee operation without zero drift by implementing simply and cheaply circuits that are not asymmetrical, and simultaneously enabling circuits to be implemented that consume little energy and can therefore operate on small power supply batteries giving a lifetime of several years.

The logic gates 101, 102 or 221 to 224 may simply be fast inverting gates with response times of the order of a few nanoseconds. The resistors 103, 105 and 225 to 228 may be constituted by low cost discrete components in spite of the requirements for them to be of matched resistances. The switches 111, 112 and 211, 212 are not subjected to severe constraints concerning their characteristics, providing the receiver amplifier 110, 210 has very high input impedance, of the order of a few GΩ. Consequently, the switches can also be constituted by low cost components. The improvement to the properties of electronic circuits of the invention can thus be achieved without increasing complexity or cost.

Also, the measurement apparatus of the invention is suitable for being incorporated in gas meter apparatus located on the premises of a subscriber in a distribution network.

In the apparatuses shown in FIGS. 1 and 2, there nevertheless remains some coupling via the circuit between the transducer which is transmitting and the transducer which is receiving.

Figure 5:
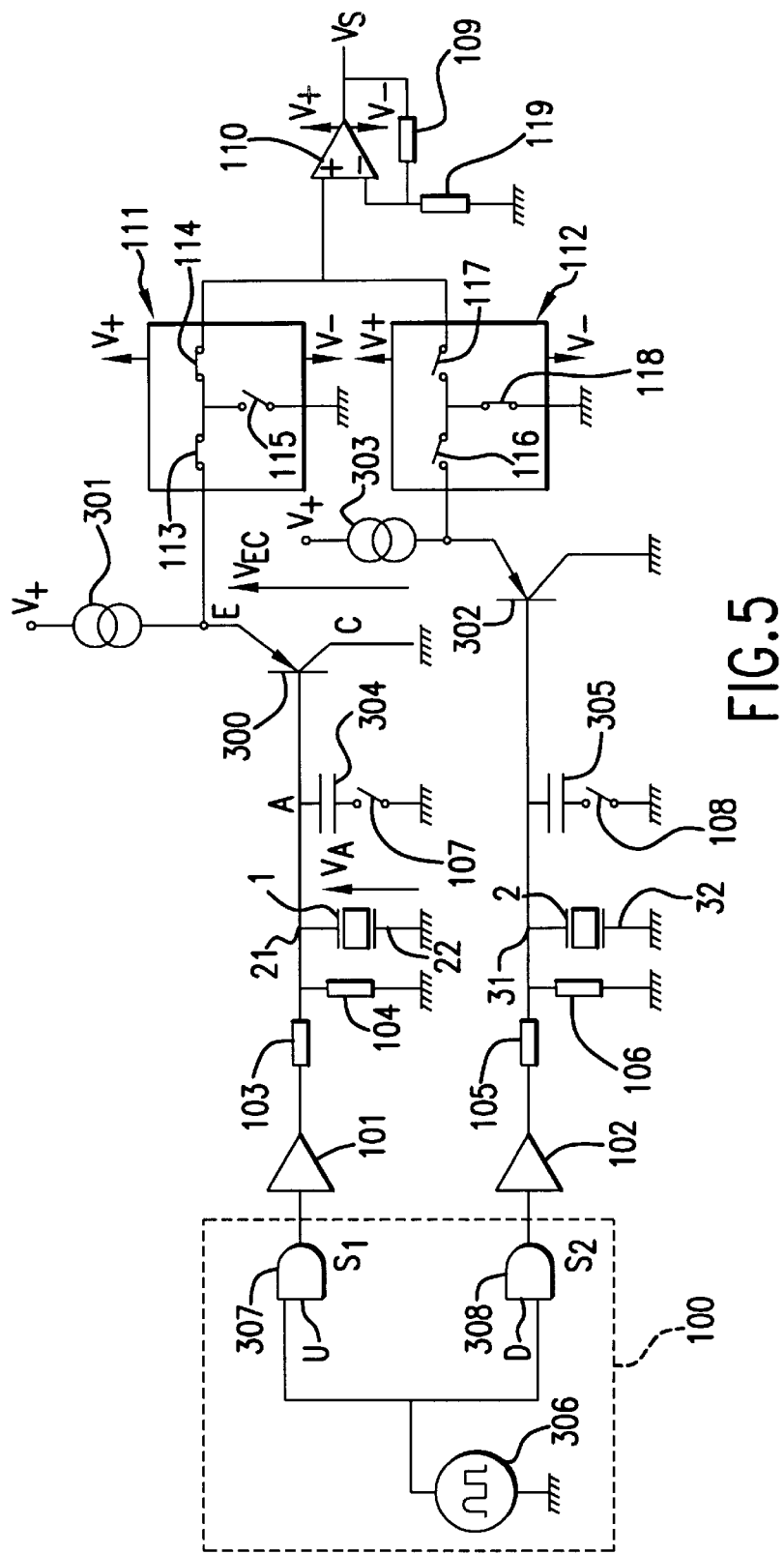
FIG. 5 is a circuit diagram of a portion of the electronic circuits of apparatus for measuring the flow speed of a gas in a third embodiment of the invention.

In order to further reduce the magnitude of the coupling current, provision can be made to locate a transistor 300 in a common collector configuration between the terminal 21 that is not connected to ground of transducer 1 in FIG. 1 and the switch block 111, with the base of this transistor being connected to said terminal (FIG. 5). The emitter of the transistor is connected firstly to a current source 301 and secondly to the block 111, while its collector C is connected to ground.

The transistor 300 presents high input impedance as seen by the transmitting transducer 1, thereby improving in simple manner the decoupling between the two channels of the circuit in which these transistors are included.

Other, more-complicated means also serve to create a large impedance across the terminals of each transducer.

An identical transistor 302 and current source 303 are provided on the other channel in which the transducer 2 is installed, likewise between the terminal 31 and the switch block 112 so as to obtain a circuit that is as symmetrical as possible.

The two current sources 301 and 303 are matched to within 1%.

Any change in the current flowing through the emitter of a transistor is referenced to the base thereof, being divided by the gain of the transistor.

In FIG. 5, elements of FIG. 1 that have not been changed keep the same references. The fact of including these transistors in the apparatus also has the advantage of making it possible to use an asymmetrical power supply (e.g. of the type where V+=3 V and V-=0) for powering the switches and the receiver amplifier 110, thereby reducing the financial cost and the electricity consumption of such apparatus compared with apparatus in which it is necessary to have a symmetrical power supply of the +3 V, -3 V type.

This is made possible by the presence of a transistor whose saturation voltage between its emitter and its collector is maintained by a constant current that saturates said transistor, thus adding a DC voltage to the received signal and thus bringing the mean value of the signal obtained to $V_{EC}$ instead of to a zero value.

Also, when the apparatus of FIG. 1, 2 or 5 is switched on (prior to transmitting the transmission signal), the switch 107 is closed and the voltage $V_A$ across the terminals of the transducer 1 changes suddenly from a fixed value of 0, thereby causing the transducer 1 to oscillate, and likewise causing the receiver amplifier 110 to oscillate.

In order to remedy this problem, memory means, e.g. formed by a capacitor 304 (or 305), are installed in series with the switch 107 (or 108), thereby enabling the voltage $V_A$ to be maintained across the terminals of the transducer 1 while the apparatus is being switched on.

FIG. 5 also shows in greater detail the transmission signal generator 100 of FIG. 1 or 200 of FIG. 2.

The transmission signal generator 100 thus comprise a generator 306 which applies squarewave signals to two inputs of two logic AND gates 307 and 308, with the other inputs of these gates receiving respective digital control signals U and D.

Each gate 307, 308 delivers an output signal $S_1$, $S_2$ as a function of the 0 or 1 value of the control signals U and D.

We claim:

1. Ultrasound apparatus for measuring the speed of flow of a fluid, the apparatus comprising first and second ultrasound transducers disposed at points spaced apart in the flow direction of the fluid, a transmitter module, a receiver module, an electrical power supply module, an electronic control circuit, and switch means organized in such a manner that each of the first and second transducers operates alternately as a transmitter and as a receiver, one of the transducers operating as a transmitter while the other transducer is operating as a receiver, and vice versa, the apparatus being characterized in that the transmitter module comprises at least one transmission signal generator whose output is permanently connected via a first logic gate followed by a first resistive divider bridge to a first terminal of the first transducer, and via a second logic gate followed by a second resistive divider bridge to a first terminal of the second transducer, so that each transducer is associated with the same impedance when operating as a transmitter and as a receiver, and in that first and second switching means are interposed between the receiver module and the first terminals of the first and second transducers respectively, in order to avoid the coupling between the transducers via the electronic circuit.

2. Apparatus according to claim 1, characterized in that the first resistive divider bridge includes a first resistor connected between the first terminal of the first transducer and the output of the first logic gate, and of resistance that is much greater than the output impedance of said first logic gate, and in that the second resistive divider bridge includes a second resistor connected between the first terminal of the second transducer and the output of the second logic gate, and of resistance that is much greater than the output impedance of said second logic gate.

3. Apparatus according to claim 2, characterized in that the first and second resistors have resistances that are identical to within less than 0.1%.

4. Apparatus according to claim 1, characterized in that the first and second logic gates are implemented in the same integrated circuit.

5. Apparatus according to claim 1, characterized in that the receiver module comprises a single non-inverting amplifier of high input impedance.

6. Apparatus according to claim 5, characterized in that the first and second switch means are implemented in different integrated circuits.

7. Apparatus according to claim 5, characterized in that the first switch means comprises first and second switches connected in series between said first terminal of the first transducer and the non-inverting input of the non-inverting amplifier, together with a third switch connected between a point common to the first and second switches and to a reference potential, the third switch being open when the first and second switches are closed, and vice versa, and in that the second switch means comprises fourth and fifth switches connected in series between said first terminal of the second transducer and the non-inverting input of the non-inverting amplifier, together with a sixth switch connected between a point common to the fourth and fifth switches and to a reference potential, the sixth switch being open when the fourth and fifth switches are closed, and vice versa.

8. Apparatus according to claim 1, characterized in that it includes a pulsed electrical power supply module and first and second additional switches connected in parallel with the first and second transducers respectively, the first and second additional switches being controlled so as to be closed in temporary manner each time the first and second transducers are switched on from the pulsed electrical power supply module.

9. Apparatus according to claim 1, characterized in that the electrical power supply comprises a self-contained source of energy comprising at least one battery and at least one amplifier for defining a reference potential constituting a midpoint relative to the voltage available across the terminals of the self-contained energy source, the first and second transducers and the transmitter module all being referenced relative to said reference potential constituting a midpoint.

10. Apparatus according to claim 9, characterized in that the first logic gate is subdivided into identical third and fourth logic gates whose inputs are permanently connected to the transmission signal generator and whose outputs are connected via respective same-resistance third and fourth resistors constituting potions of the first resistive divider bridge to a first terminal of the first transducer whose second terminal is connected to said reference potential and in that the second logic gate is subdivided into identical fifth and sixth logic gates whose inputs are permanently connected to the transmission signal generator and whose outputs are connected via respective same-resistance fifth and sixth resistors identical in resistance to the third and fourth resistors and constituting potions of the second resistive divider bridge to a second terminal of the second transducer whose second terminal is connected to said reference potential.

11. Apparatus according to claim 1, characterized in that the apparatus includes means for creating a high impedance as seen from the terminals of each transducer while it is transmitting, thereby decoupling the two transducers from each other.

12. Apparatus according to claim 11, characterized in that a transistor is connected in a common collector configuration across the terminals of each transducer, and a saturation voltage $V_{EC}$ is maintained between the emitter and the collector of said transistor by respective constant current generator saturating it.

13. Apparatus according to claim 12, characterized in that both transistors are disposed between the respective one of the first and second switch means and the respective transducer, the bases of the transistors being connected to the terminals of the corresponding transducers and the emitters of the transistors being connected to respective matched current sources and to the corresponding first or second switch means.

14. Apparatus according to claim 8, characterized in that voltage storage means for storing the voltages at the terminals of each of the transducers are connected in series with each respective first and second additional switch and in parallel with the corresponding first or second transducer.

* * * * *